United States Patent [19]

Erickson et al.

[11] 4,244,666

[45] Jan. 13, 1981

[54] PIN LOCK TOOL HOLDER

[75] Inventors: Robert A. Erickson, Ligonier; Ernest J. Friedline; Donald W. Warren, both of Latrobe, all of Pa.

[73] Assignee: Kennametal Inc., Latrobe, Pa.

[21] Appl. No.: 47,648

[22] Filed: Jun. 11, 1979

Related U.S. Application Data

[63] Continuation-in-part of Ser. No. 894,729, Apr. 10, 1978, abandoned.

[51] Int. Cl.³ .............................................. B26D 1/12
[52] U.S. Cl. .................................... 407/105; 407/107
[58] Field of Search ............... 407/103, 104, 105, 106, 407/107, 109, 112, 111, 50, 46, 47, 48

[56] References Cited

U.S. PATENT DOCUMENTS

| 2,836,426 | 5/1958 | Crawford | 407/112 |
|---|---|---|---|
| 2,848,789 | 8/1958 | Friedline | 407/112 |
| 3,067,638 | 12/1962 | Eckardt et al. | 407/47 |
| 3,084,416 | 4/1963 | Broughton | 407/107 |
| 3,469,296 | 9/1969 | Reeve et al. | 407/105 |
| 3,488,822 | 1/1970 | Jones | 407/105 |
| 3,491,421 | 1/1970 | Holloway | 407/105 |
| 3,525,136 | 8/1970 | Crosby | 407/105 |
| 3,579,776 | 5/1971 | Mihic | 407/105 |
| 3,683,473 | 8/1972 | Joynson | 407/105 |
| 3,821,837 | 7/1974 | Faber | 407/109 |

Primary Examiner—Harrison L. Hinson
Attorney, Agent, or Firm—Lawrence R. Burns

[57] ABSTRACT

An improved tool holder of the type having an insert receiving pocket and using tiltable pin to clamp an insert in the pocket. The pin is located in a bore through the bottom of the pocket of the tool holder and is tiltable therein so that one end of the pin engages a center hole of an insert and clamps it in the pocket. A recess communicates with the bore near the lower end of the pin when the pin is in the bore and spherical elements such as balls are disposed in said recess. Means for moving said spherical elements are provided so that the pin is tilted into clamping position on the insert. A top clamp is provided that cooperates with the pin element in clamping said insert.

21 Claims, 9 Drawing Figures

PIN LOCK TOOL HOLDER

RELATED APPLICATION

The present application is a continuation-in-part of copending application Ser. No. 894,729, filed Apr. 10, 1978, now abandoned.

BACKGROUND OF THE INVENTION

This invention relates to tool holders having indexable insert receiving pockets that detachably hold inserts during cutting operations.

The tool holders have a bore through a bottom of the insert receiving pocket and an elongated pin member is disposed in said bore. The upper end of the pin enters into the region of the pocket and registers with a center hole in the insert to be clamped. Movement of the upper portion of the pin is effected in some manner so that the upper part of the pin engages the center hole and clamps the insert to a side wall of the pocket in the tool holder.

Examples of such tool holders are evidenced by U.S. Pat. No. 3,488,822, issued to D. G. Jones, and assigned to applicant corporation. Further examples of these types of tool holders are U.S. Pat. Nos. 3,792,516; 3,316,616; 3,889,332; 3,579,776; 3,491,421; 3,555,786 and 3,496,296.

BRIEF SUMMARY OF THE INVENTION

According to the present invention, an improved tool holder is disclosed, having an insert receiving pocket for indexably supporting an insert. The pocket has a side wall and bottom wall with a bore extending in the tool holder through the bottom wall of the pocket.

A pin has one end portion disposed in said bore and another end portion extending into the region of the pocket and adapted for engaging a center hole in a cutting insert. The pin preferably has a region between its end portions that closely fits with the side of said bore while the portions of the pin on opposite sides of the region have clearance in the bore so that the pin is tiltable in the bore about the region.

A recess is formed in the tool holder and communicates with the bore near the one end portion of the pin disposed in the bore. Spherical elements, preferably balls, are located in the recess with one of the elements contacting the one end portion of the pin. The pin is preferably grooved around the periphery of the one end portion with the groove engaging a part of the spherical element located in the recess. This engagement of the spherical element and the grooved end portion aids in keeping the pin captive on the tool holder when the insert is not clamped in the pocket.

A means for moving the spherical elements is provided so that the pin is tilted in the bore and the other end portion of the pin clamps the cutting insert in the pocket.

Preferably, the means for moving the spherical elements comprises a cam means having a first position camming said spherical elements into contact with the one end portion of the pin and tilting it into clamping position. The cam means has a second position wherein the spherical elements are not in cammed contact with the one end portion of the pin and the pin is not clamping an insert in the pocket.

The cam means is preferably located in a hole in the tool holder with the recess communicating with the hole. Preferably, the cam means is linearly slidable in the hole and having a first position tilting said pin into clamping position and a second position tilting said pin out of clamping position.

Preferably, a spring means is utilized with the cam means so that the cam means is always urged into the first position to provide a constant clamping action. Outside forces are then used to overcome the spring means so as to unclamp the cutting insert from the pocket of the tool holder.

Preferably, the linearly slidable cam means has means connecting a top clamp to the cam means so that the top clamp can firmly press down on the top of the insert when the pin is tilted into clamping position. The preferred arrangement is to provide a shoulder in the hole and to have a double ended, oppositely threaded screw member extending on both sides of said shoulder area in the hole.

A cam element is fitted on the lower end of the threaded member by an off center threaded hole in the cam element. Around the upper part of the threaded element is a spring which abuts against the shoulder in the hole on one end and a top clamp threadedly connected to said threaded element.

Rotation of the threaded element in one direction then brings the cam element and top clamp toward one another along the threaded element so as to clamp the insert in the pocket. Rotation of the threaded element in the other direction moves the top clamp and cam element away from one another on the threaded element. The top clamp disengages the insert but the spring means keeps the cam element against the spherical elements. Stops are provided between the top of the hole and the clamp member that allow the clamp in a certain position to rotate only part way around a full circle of 360 degrees.

A particular object of the present invention is the provision of an improved arrangement for detachably securing a cutting insert in a pocket of a tool holder.

Another object of this invention is the provision of a quick acting and efficient means of replaceably securing a cutting insert in a pocket of a tool holder.

Another object of this invention is to provide a tool holder that can simply, quickly and accurately locate an insert in a pocket of the tool holder and clamp the insert with a clamping force that can be varied.

The exact nature of the present invention will become more clearly apparent upon reference to the following detailed specification taken in connection with the accompanying drawings in which.

DETAILED DESCRIPTION OF THE INVENTION

Figure 1:
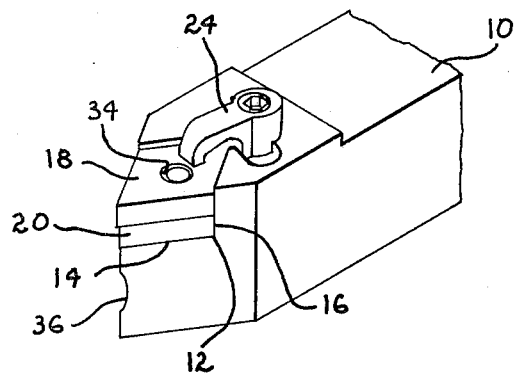
FIG. 1 is a perspective of a tool holder and top clamp according to the present invention.

Referring to the drawings somewhat more in detail, what is shown in FIG. 1 is tool holder 10 having an insert receiving pocket 12 on its forward end portion. An insert receiving pocket 12 has a bottom wall 14 and a side wall 16. Insert 18 sits in the insert receiving pocket 12 and usually has a shim member 20 upon which it sits in the pocket 12. A center hole 34 is shown in insert 18 and a top clamp member 24 is shown pressing down on top of insert 18.

Figure 2:
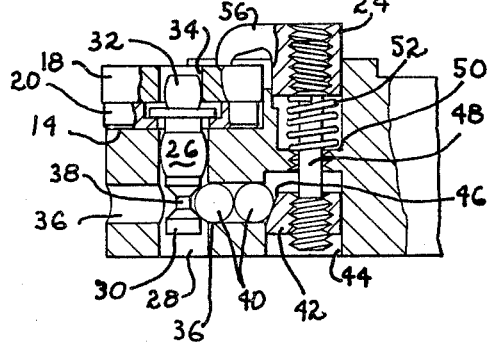
FIGS. 2, 3 and 4 are cut away views of a vertical section of the forward portion of the tool holder in FIG. 1.

Looking at FIG. 2, in a cut away section, can be seen the full extent of the clamping mechanism of the present invention. Pin element 26 is shown disposed in an insert receiving bore 28 with the insert receiving bore 28 extending downwardly in the tool holder through the bottom wall 14 of insert receiving pocket 12.

Shim member 20 is shown supporting insert 18 with shim member 20 being in firm contact with bottom wall 14 of pocket 12. Pin element 26 has one end portion 30 disposed in the bore 28 and another end portion 32 which extends up in the region of a pocket 12 and engages a center hole 34 of insert 18.

Recess 36 is made in tool holder 10 and communicates with bore 28. Lower end portion 30 of pin element 26 preferably has groove 38, and recess 36 preferably registers with the groove 38 or the lower end portion 30 of pin element 26 if pin element 26 is not grooved.

Spherical elements 40 are disposed in recess 36 and contact a cam element 42. Cam element 42 is located in a hole 44 in tool holder 10 and recess 36 communicates with hole 44. The cam element 42 is a cylindrical member having a chamfer 46 along one side so that, in a first position, as shown in FIG. 2, cam 42 is in contact with spherical elements 40. When cam element 42 is in contact with spherical elements 40, this forces pin element 26 to tilt and clamp insert 18 in the pocket of the tool holder.

Cooperating elements of tilting means are shown between pin element 26 and bore 28 and is preferably accomplished by pin element 26 having a region between its end portions 32 and 30 closely fitting with the side of bore 28 while the portions 30 and 32 on opposite sides of the enlarged region have clearance in the bore so that the pin is tiltable in bore 28 about its mid-region.

Cam element 42 is preferably threadedly connected to double ended pin 48. Double ended pin 48 is disposed in hole 44 and has threads on each end with the threads on each end being opposites. A shoulder 50 is formed in hole 44 and spring 52 sits on shoulder 50. On the opposite end of the double ended pin 48 from cam element 42 sits clamp member 24 which, when threaded on double ended pin 48, compresses spring 52 into the upper portion of hole 44.

Clamp member 24 may or may not have an overhanging finger 56 which extends over the path of upward travel of insert 18. When clamp member 24 does not have finger 56, then, as shown in FIG. 2, the spring member 50 urges cam element 42 into its first position, so as to hold the insert 18 clamped in insert receiving pocket 12, in order to move cam element 42 into a second position so that the pin element 26 tilts out of clamping engagement with insert 18, and all that is necessary for clamp member 24 to be pressed in a downward direction so as to overcome the spring force.

If clamp member 24 has a finger 56, then when double ended pin 48 is rotated, clamp member 24 and cam element 42 travel toward each other along double ended pin 48. Rotation of double ended pin 48 in one direction then will bring cam element 42 into a clamping position and will bring the finger 56 of top clamp member 24 downward on the top face of insert 18. This position then forms a firm and accurately located clamping position for the insert.

Figure 3:
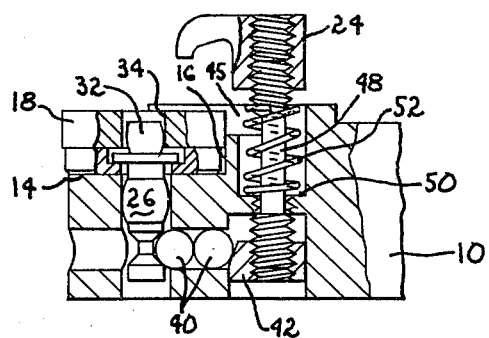

Shown in FIG. 3 is a tool holder 10, the insert 18 still being held in clamped position by pin element 26. End 32 of pin element 26 is engaged with the side of the hole 34 and is pressing the insert back against side wall 16 of pocket 12. Clamp member 24 and cam element 42 are shown on double ended threaded element 48.

Rotation of the double ended threaded element 48 has advanced both members 42 and 24 away from one another. Spring 52, however, being seated upon shoulder 50, has kept cam element 42 engaged with spherical elements 40 so that the pin element 26 holds insert 18 clamped in tool holder 10.

As can be seen between FIGS. 2 and 3, rotation of the double ended threaded element 48 in one direction will serve to advance cam element 42 and members 24 toward another along double ended pin 48 while rotation in the opposite direction will serve to advance members 42 and 24 away from one another along double ended threaded member 48.

Figure 7:
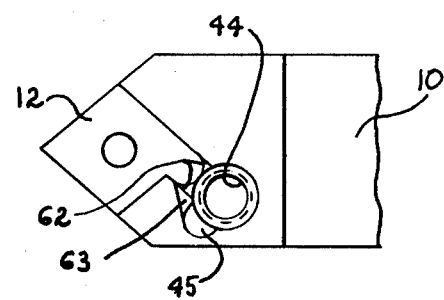
FIG. 7 is a top view of a tool holder according to the present invention.

As can be seen in FIG. 7, the top part of hole 44 has an enlarged portion 45. In addition to enlarged portion 45, there is an opening 62 from hole 44 to the pocket region 12 of the tool holder. A slight protrusion 63 of the tool holder separates the opening 62 from the pocket 12 to the hole 44 from communicating with the enlarged portion 45 of hole 44.

Keyed portion 60 is shown on clamp member 24 as shown in FIG. 1 and this keyed portion, when the clamp is tightened, fits into the opening 62 shown in FIG. 7. As the double ended threaded member 48 is rotated and clamp member 24 advances upwardly in hole 44, the lower part of the keyed member 60 will slide over the top of the slight protrusion 63 but will be halted by the back part of the enlargement 45. The top of the protruding portion 63 is not as high as the top of the wall of the enlarged portion 45.

Preferably, the double ended pin 48 is being rotated counterclockwise so that the forces of the threads will turn the clamp member 24 by themselves.

Figure 6:
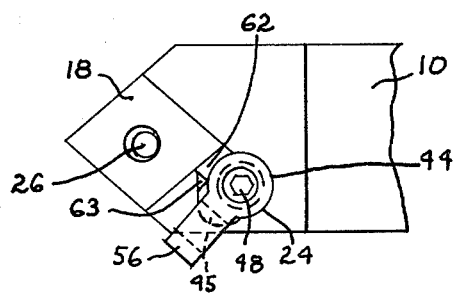
FIG. 6 is a top view of the tool holder of FIG. 1 with the clamp rotated to one side.

Referring to FIG. 6, what is shown therein is a tool holder 10 in which double ended threaded element 48 has been rotated counterclockwise such that clamp member 24 has advanced upwardly until the key 60 cleared the top part of the protruding portion 63 in which case the entire clamp member 24 rotated until finger 56 is in the position shown in FIG. 6.

At this point, the keying element 60 has stopped now against the wall of enlarged portion 45 of hole 44. The enlarged portion 45 is large enough to allow the keyed section 60 of clamp member 24 to pass downward therethrough so that pressure on clamp member 24 will cause the cam element 42 to travel downward and be as pictured in FIG. 4.

Figure 4:
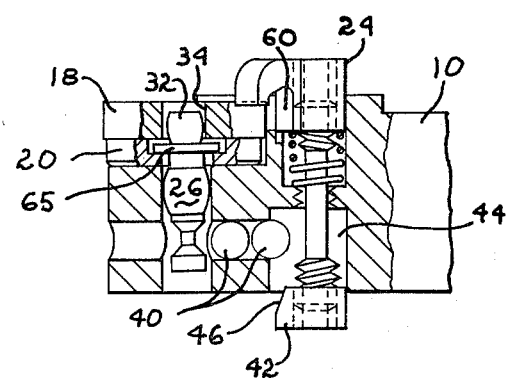

Pictured in FIG. 4 is tool holder 10 having clamp member 24 depressed and cam element 42 is disengaged from spherical elements 40. When spherical elements 40 are disengaged from cam element 42, pin element 26 is allowed to tilt in the hole and thereby to disengage from the side of hole 34 of insert 18.

Since the top clamp 56 is now out of the upward path of travel of insert 18, insert 18 may easily be removed so that it can be either indexed or replaced. There is a flange 65 on pin element 26 that captively holds shim member 20 on the tool holder assembly so that it does not come off with the insert.

All that is necessary to do this is to replace insert 18 in the top of shim 20 while holding the clamp member 24 and cam element 42 depressed. Once the insert 18 is in position, the hole of the insert 34 surrounds the upper portion 32 of pin element 26, the outside pressure force may be released from threaded element 48. Upon being released from threaded element 48, cam element 42 may travel up to be engaged by spherical members 40 as shown in FIG. 3.

Rotation of the double ended threaded member 48 in the clockwise direction will then cause clamp member 24 to rotate with the double ended threaded element 48 until the keying element stops against the side wall of the pocket. This advantageously stops when the finger member 56 is directly over the upward travel of the path of the insert 18 and further rotation of double ended threaded member 48 causes the finger 56 of clamp member 24 to firmly engage and press down on the top of insert 18 while cam element 42 forces the spherical elements to tilt the pin so that the insert is held firmly against the back wall of the pocket.

Figure 5:
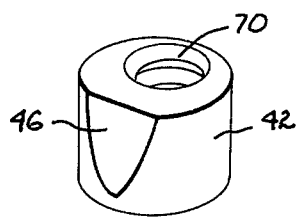
FIG. 5 is a cam element used with the present invention.

Shown in FIG. 5 is cam element 42 having the chamfer 46 shown thereon that is meant to engage spherical elements 40. While cam element 42 threadedly engages the double ended threaded element 48, the threaded engagement is preferably with a perforation 70 formed off-center through cam element 42. The perforation 70 is threaded, and thus, when double ended threaded element 48 is rotated in either direction, the cylindrical element 42 will not rotate in hole 44. The top part of hole 44 above shoulder 50 is not on the same axial center line as the bottom part of hole 44 below shoulder 50.

Figure 8:
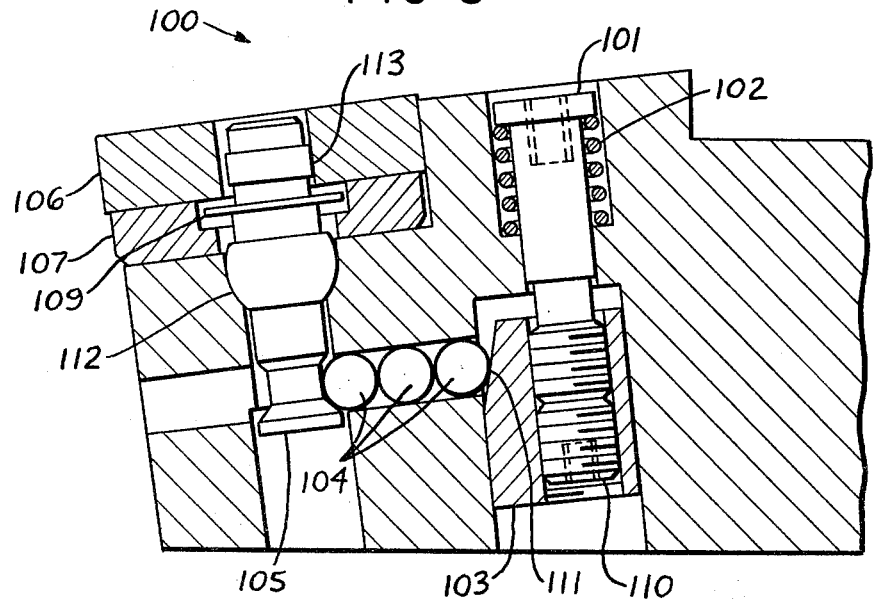
FIG. 8 is a modified tool holder according to the present invention.

What is shown in FIG. 8 is wedge screw 101 threaded into the wedge 103. The wedge of holder 200 is a concentric item while that of holder 100 is cylindrical with the tapped hole for the wedge screw 101 located off-center. Wedge surface 111 is a machined flat on the wedge. Spring 102 forces wedge into contact with balls 104, displacing balls and forcing contact with pin bottom 115. Pin 115 rotates about spherical portion 112 forcing contact band 113 into contact with insert 106 and ultimately forcing insert back into the insert pocket of the tool holder. Pressure is maintained by the spring force acting through the wedge 103. The angle of the wedging surface is such that a force applied to the insert 106 to force it from the pocket will not, when transmitted through the balls 104 to the wedge 103, cause downward motion of the wedge, loosening the system. Collar 109 on pin 105 prevents the shim 107 from entering the cutting path.

Figure 9:
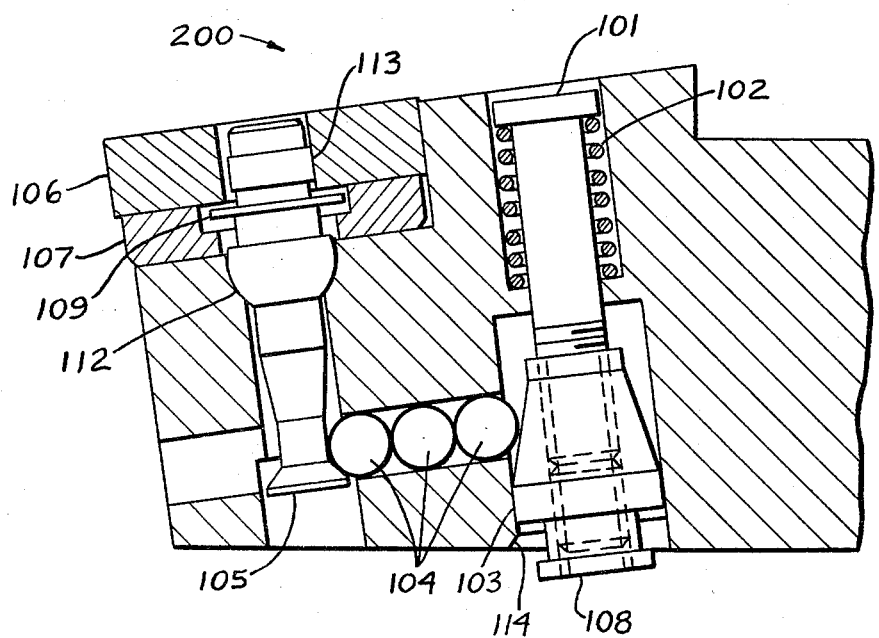
FIG. 9 is a modified tool holder as shown in FIG. 8.

As shown in FIG. 9, operator uses tool (blade of screwdriver, etc.) to apply downward pressure to wedge screw 101. Wedge 116 is displaced in a downward direction, relieving force from balls 104. Pin 105 is then free to pivot about spherical surface 112 and insert 106 can be removed and replaced. Downward force is then removed from wedge screw 101 and insert is secured. Tool Holder 200 incorporates a feature for insert release from the bottom surface of the tool holder. Screwdriver blade is inserted between countersink shoulder 114 and wedge lip 108. Using the screwdriver as a lever, the wedge is forced downward against opposing spring pressure, releasing balls and insert.

Modifications may be made within the scope of the appended claims.

What is claimed is:

1. In a tool holder having an insert receiving pocket for supporting an insert, the pocket having at least a side wall and bottom wall, a pin receiving bore extending in the tool holder through the bottom wall of the pocket, a pin having one end portion disposed in the bore and another end portion for engaging a center hole in a cutting insert, the pin having a region between the end portions thereof closely fitting with a side of said bore while the portions of said pin on opposite sides of said region have clearance in the bore so that the pin is tiltable in the bore about said region, a recess communicating with said bore near said one end portion of said pin, spherical elements in said recess contacting said one end of said pin, and means for moving said spherical element so as to tilt said pin in said bore and clamp a cutting insert in said pocket, the improvement which comprises; said pin having a groove cut around said one end portion and positioned on said pin so as to register with said recess when said pin is disposed in said bore, said means for moving said spherical elements comprising linearly slidable cam means located in a hole in said tool holder, said recess and said spherical elements communicating with said hole and a first position of said cam means tilting said pin into clamping position and a second position tilting said pin out of clamping position, and said slidable cam means having means connecting a top clamp such that said top clamp firmly presses down on the top of the insert in the pocket when said pin is tilted into clamping position.

2. The improvement according to claim 1 in which said means connecting said top clamp and cam means comprises a double ended oppositely threaded fastener.

3. The improvement according to claim 2 which further includes said top clamp swinging out of the path of upward insert travel when said fastener is loosened and swinging over the path of upward insert travel when said fastener is tightened.

4. In a tool holder having an insert receiving pocket for supporting an insert, the pocket having at least a side wall and bottom wall, a pin receiving bore extending in the tool holder through the bottom wall of the pocket, a pin having one end portion disposed in the bore and another end portion for engaging a center hole in a cutting insert, the pin having a region between the end portions thereof closely fitting with a side of said bore while the portions of said pin on opposite sides of said region have clearance in the bore so that the pin is tiltable in the bore about said region, a recess communicating with said bore near said one end portion of said pin, spherical elements in said recess contacting said one end of said pin, and means for moving said spherical element so as to tilt said pin in said bore and clamp a cutting insert in said pocket, the improvement that comprises; said pin having a groove cut around said one end portion and positioned on said pin so as to register with said recess when said pin is disposed in said bore, said means for moving said spherical elements comprising cam means, a double ended oppositely threaded element, said cam element on one end of said double ended element and a top clamp on the other end of said double ended element, means for swinging said top clamp out of the way of upward travel of an insert when said element is rotated in one direction and means for swinging said top clamp into the paths of upward travel when said double ended pin is rotated in an opposite direction.

5. In a tool holder having an insert receiving pocket with a side wall and a bottom wall, a pin receiving bore extending in the tool holder through said bottom wall, a tiltable pin having opposing ends and an intermediate region disposed in the bore with one end portion extending in said pocket to clamp an insert, a recess communicating with said bore with means for tilting said pin in said recess, the improvement which comprises; linearly slidable cam means located in a hole in said tool holder, said recess and said means for tilting said pin communicating with said hole and said cam means, said linearly slidable cam means having a first position tilting said pin into clamping position and a second position tilting said pin out of clamping position, and said slidable cam means having means connecting a top clamp such that said top clamp firmly presses down on the top of the insert when said cam means has said pin tilted into clamping position.

6. A tool holder according to claim 5 wherein said means connecting said top clamp and cam means is a double ended oppositely threaded element located in said tool holder.

7. A tool holder according to claim 6 which further includes spring means urging said cam means into engagement with said means for tilting said pin.

8. A tool holder according to claim 7 in which said means for tilting said pin comprises spherical elements in said recess communicating between said cam means and said tiltable pin.

9. A tool holder according to claim 8 which further comprises said pin having a groove cut around said one end portion and positioned on said pin so as to register with said recess when said pin is disposed in said bore.

10. In a tool holder having an insert receiving pocket with a side wall and a bottom wall, a pin receiving bore extending in the tool holder through said bottom wall, a tiltable pin having opposing ends and an intermediate region disposed in the bore with one end portion extending in said pocket to clamp an insert, a recess communicating with said bore with means for tilting said pin in said recess, the improvement which comprises; linearly slidable cam means located in a hole in said tool holder, said recess and said means for tilting said pin communicating with said hole and said cam means, said linearly slidable cam means having a first position tilting said pin into clamping position and a second position tilting said pin out of clamping positon, a double ended oppositely threaded element located in the tool holder and having said cam element on one end and a top clamp in the other end and means for swinging said top clamp out of the way of upward travel of an insert when said element is rotated in one direction and means for swinging said top clamp into the paths of upward travel when said double ended pin is rotated in an opposite direction.

11. In a tool holder having an insert receiving pocket for supporting an insert, the pocket having at least a side wall and bottom wall, a pin receiving bore extending in the tool holder through the bottom wall of the pocket, a pin having one end portion disposed in the bore and another end portion for engaging a center hole in a cutting insert, the pin having a region between the end portions thereof closely fitting with a side of said bore while the portions of said pin on opposite sides of said region have clearance in the bore so the pin is tiltable in the bore about said region, a recess communicating with said bore near said one end portion of said pin, said recess containing a means for tilting said pin in said bore and clamping a cutting insert in said pocket, the improvement which comprises; the recess communicating with said pin receiving bore containing spherical elements contacting said one end of said pin, and means for moving said spherical element so as to tilt said pin in said bore and clamp a cutting insert in said pocket, said pin having a groove cut around said one end portion and positioned on said pin so as to register with said recess when said pin is disposed in said bore, said means for moving said spherical elements comprising a linearly slidable cam means located in a hole in said tool holder, said recess and said spherical elements communicating with said hole and a first position of said cam means tilting said pin into clamping position, and a second position tilting said pin out of clamping position, said slidable cam means having means connecting to a spring means urging said cam means into engagement with said means for tilting said pin, clamping said insert in said pocket.

12. In a tool holder according to claim 11 which includes provisions for a top clamp, such that said top clamp is capable of firmly pressing down on the top of the insert; said top clamp having connecting means to said slidable cam means such that said top clamp firmly presses down on the top of the insert in the pocket when said pin is tilted into clamping position.

13. In a tool holder according to claim 12 in which said means connecting said top clamp and cam means comprises a double ended oppositely threaded fastener.

14. The improvement according to claim 13 in which a means is included for swinging said top clamp out of the path of upward insert travel when said fastener is loosened and swinging over the path of upward insert travel when said fastener is tightened.

15. In a tool holder having an insert receiving pocket for supporting an insert, the pocket having at least a side wall and bottom wall, a pin receiving bore extending in the tool holder through the bottom wall of the pocket, a pin having one end portion disposed in the bore and another end portion for engaging a center hole in a cutting insert, the pin having a region between the end portions thereof closely fitting with a side of said bore while the portions of said pin on opposite sides of said region have clearance in the bore so the pin is tiltable in the bore about said region, a recess communicating with said bore near said one end portion of said pin, said recess containing a means for tilting said pin in said bore and clamping a cutting insert in said pocket, said tool holder having provision for a top clamp such that said top clamp is capable of firmly pressing down on the top of the insert, the improvement which comprises; the recess communicating with said pin receiving bore contains spherical elements contacting said one end of said pin, and means for moving said spherical element so as to tilt said pin in said bore and clamp a cutting insert in said pocket, said pin having a groove cut around said one end portion and positioned on said pin so as to register with said recess when said pin is disposed in said bore, said means for moving said spherical elements comprising cam means, a double ended oppositely threaded element, said cam element on one end of said double ended element, means for swinging said top clamp out of the way of upward travel of an insert when said element is rotated in one direction and means for swinging said top clamp into the paths of upward travel when said double ended pin is rotated in an opposite direction.

16. In a tool holder having an insert receiving pocket with a side wall and a bottom wall, a pin receiving bore extending in the tool holder through said bottom wall, a tiltable pin having opposing ends and an intermediate region disposed in the bore with one end portion extending in said pocket to clamp an insert, a recess communicating with said bore with means for tilting said pin in said recess, said tool holder having provision for a top clamp, the improvement which comprises; linearly slidable cam means located in a hole in said tool holder, said recess and said means for tilting said pin communicating with said hole and said cam means, said linearly slidable cam means having a first position tilting said pin into clamping position and a second position tilting said pin out of clamping position, and said slidable cam means having means connecting a top clamp such that said top clamp firmly presses down on the top of the insert when said cam means has said pin tilted into clamping position.

17. A tool holder according to claim 16 in which said means connecting said top clamp and cam means is a double ended oppositely threaded element located in said tool holder.

18. A tool holder according to claim 17 in which a spring means is included urging said cam means into engagement with said means for tilting said pin regardless of position of said top clamp.

19. A tool holder according to claim 18 in which said means for tilting said pin comprises spherical elements in said recess communicating between said cam means and said tiltable pin.

20. A tool holder according to claim 19 in which said pin incorporates a groove cut around said one end portion and positioned on said pin so as to register with said recess when said pin is disposed in said bore.

21. In a tool holder having an insert receiving pocket with a side wall and a bottom wall, a pin receiving bore extending in the tool holder through said bottom wall, a tiltable pin having opposing ends and an intermediate region disposed in the bore with one end portion extending in said pocket to clamp an insert, a recess communicating with said bore with means for tilting said pin in said recess, said tool holder having provisions for a top clamp, the improvement which comprises; linearly slidable cam means located in a hole in said tool holder, said recess and said means for tilting said pin communicating with said hole and said cam means, said linearly slidable cam means having a first position tilting said pin into clamping position and a second position tilting said pin out of clamping position, a double ended oppositely threaded element located in the tool holder and having said cam element on one end and a top clamp in the other end and means for swinging said top clamp out of the way of upward travel of an insert when said element is rotated in one direction and means for swinging said top clamp into the paths of upward travel when said double ended pin is rotated in an opposite direction.

* * * * *